United States Patent [19]

Shibano et al.

[11] Patent Number: 4,569,712
[45] Date of Patent: Feb. 11, 1986

[54] PROCESS FOR PRODUCING SUPPORT FOR USE IN FORMATION OF POLYURETHAN FILMS

[75] Inventors: Tomishi Shibano, Tokyo; Hironori Ozawa, Saitama; Sachio Maruchi, Tokyo, all of Japan

[73] Assignee: Sanyo Kokusaku Pulp Co., Ltd., Tokyo, Japan

[21] Appl. No.: 529,694

[22] Filed: Sep. 2, 1983

[30] Foreign Application Priority Data

Nov. 12, 1982 [JP] Japan .................................. 57-198449

[51] Int. Cl.⁴ ...................... B32B 31/00; B32B 31/30; B32B 33/00
[52] U.S. Cl. .............................. 156/244.14; 156/289; 428/286; 428/424.8; 428/904
[58] Field of Search .......................... 156/244.14, 289; 428/286, 424.8, 537.5, 904

[56] References Cited

U.S. PATENT DOCUMENTS

| | | | |
|---|---|---|---|
| 3,418,396 | 12/1968 | Edwards et al. | 156/244.11 |
| 3,922,435 | 11/1975 | Asnes | 156/240 |
| 4,145,001 | 3/1979 | Weyenberg et al. | 156/290 |
| 4,294,889 | 10/1981 | Hashimoto | 428/515 |
| 4,477,532 | 10/1984 | Schmukler et al. | 156/244.11 |

FOREIGN PATENT DOCUMENTS 0136901 11/1977 Japan .

OTHER PUBLICATIONS

"Polyethylene on Paper", Modern Plastics, Dec. 1950, pp. 67-71.
"Priming Paper for Extrusion Coating", Tech. Ass. of the Pulp and Paper Industry, 18th Plastics-Paper Conference, Oct. 14-16, 1963.
"Plastics Films—Manufacture and Application", Plastics Research Group, GIHODO Pub. Ltd., Tokyo, Japan, 1980.

Primary Examiner—Jay H. Woo
Assistant Examiner—Timothy W. Heitbrink
Attorney, Agent, or Firm—Browdy and Neimark

[57] ABSTRACT

A process is dislosed for producing a support suitable for use in the formation of polyurethane films, the support comprising a base and a releasing layer on the base comprising a polymeric mixture of 95 to 65 parts by weight of polypropylene and 5 to 35 parts by weight of polyethylene, which process comprises extrusion coating the base with said mixture through a T-die to form the releasing layer on the base, the temperature of the mixture as extruded through the T-die being controlled below 300° C.

21 Claims, 4 Drawing Figures

PROCESS FOR PRODUCING SUPPORT FOR USE IN FORMATION OF POLYURETHAN FILMS

FIELD OF THE INVENTION

The present invention relates to a process for producing a support suitable for use in the formation of polyurethane films.

BACKGROUND OF THE INVENTION

Well-known in the art is a support suitable for use in the formation of polyurethane films comprising a base, such as a sheet of paper, and a releasing layer formed on the base from a releasing material, such as silicone, alkyd resin, polypropylene and polymethylpentene. Upon production of a polyurethane film, a film-forming polyurethane in the form of a solution or melt is coated onto such a support having a releasing layer to form a film and, after solidification by drying or cooling, the film so formed is peeled from the support. When a synthetic leather, in which a polyurethane film is incorporated, is to be prepared, a polyurethane film is formed on such a support by coating a film-forming polyurethane usually in the form of a solution onto a releasing layer of the support and then solidifying it by drying with heat; an adhesive is applied onto the polyurethane film and a cloth is stuck thereto; after solidification of the adhesive by drying with heat the support is peeled away, leaving the desired synthetic leather product.

Known supports which have heretofore been used in the formation of polyurethane films suffer from various problems.

Supports having a releasing layer of silicone tend to repel a film-forming polyurethane solution when such a solution is applied onto the silicone releasing layer. Furthermore, because of the excessive releasing tendency of silicone a polyurethane film formed on the silicone releasing layer frequently peels or becomes spontaneously released from the releasing layer during the film forming process or when an adhesive is being applied onto the film.

With supports having a releasing layer of an alkyd resin, it is not easy to peel a solidified polyurethane film from the releasing layer because of the insufficient releasing ability of the alkyd resin. There are cases in which an embossed support is used for forming polyurethane films. When a support having a releasing layer of an alkyd resin is embossed, undesirable cracks and voids are frequently formed in the releasing layer. Such cracks and voids adversely affect uniform formation of polyurethane films on the one hand and greatly reduce the releasing ability of the support.

Supports having a releasing layer of polypropylene do not suffer from the problem of repelling the film-forming solution nor that of forming cracks and voids in the releasing layer when embossed. It is not easy however to peel a solidified polyurethane film from the polypropylene releasing layer because of the insufficient releasing ability of polypropylene. The polypropylene releasing layer is rather difficult to be sharply embossed. Moreover, a support comprising a base of paper and a releasing layer of polypropylene is liable to curl up in a humid atmosphere.

Japanese Patent Laid-open Specification No. 52-136901 discloses a process for producing a sheet for use in the manufacture of synthetic leathers wherein a sheet of paper is extrusion coated with polypropylene only or a copolymer of ethylene and propylene, the coating polymer having a melting point of not lower than 150° C. As discussed in the preceding paragraph, however, supports having a releasing layer of polypropylene only are not satisfactory regarding their releasing ability and their ability to be embossed. As to copolymers of ethylene and propylene, practically it is difficult to prepare those having a melting point of not lower than 150° C. In fact most commercially available ethylene-propylene copolymers have a melting point of substantially lower than 150° C., e.g. about 140° C. or lower. More importantly, a stable or constant releasing ability is not necessarily ensured by a copolymer of ethylene and propylene having a melting point above 150° C.

More particularly, various supports intended for use in the formation of polyurethane films were prepared by extrusion coating sheets of paper with polypropylene only or mixtures of polypropylene and polyethylene in varied proportions melt extruded through a T-die, while varying the temperature of the coating material as extruded. The supports so prepared were tested for their properties, including the releasing ability, performance on being embossed and curl resistance. As a result, we have found the following facts.

(1) While polypropylene alone does not provide a satisfactory releasing ability, incorporation of a definite amount of polyethylene into polypropylene remarkably improves the releasing ability of the product.

(2) While both the performance on being embossed and the curl resistance of the product are unsatisfactory with polypropylene alone, incorporation of a definite amount of polyethylene into polypropylene improves these properties.

(3) For an appreciable improvement, incorporation of at least 5% by weight of polyethylene based on the total weight of the polypropylene and polyethylene is necessary. However, incorporation of polyethylene in excess of 35% by weight based on the total weight of the polypropylene and polyethylene or the use of polyethylene alone deteriorates the heat resistance of the product.

(4) A product having a remarkably improved releasing ability can be obtained by extrusion coating a paper base with a suitable mixture of polypropylene and polyethylene melt extruded at a temperature substantially lower than that conventionally practiced.

SUMMARY OF THE INVENTION

Thus, the present invention provides a process for producing a support suitable for use in the formation of polyurethane films, the support comprising a base and a releasing layer comprising a polymeric mixture of 95 to 65 parts by weight of polypropylene and 5 to 35 parts by weight of polyethylene on the base, which process comprises extrusion coating the base with said mixture through a T-die to form the releasing layer on the base, the temperature of the mixture as extruded through the T-die being controlled below 300° C.

DETAILED DESCRIPTION OF THE INVENTION

Figure 1:
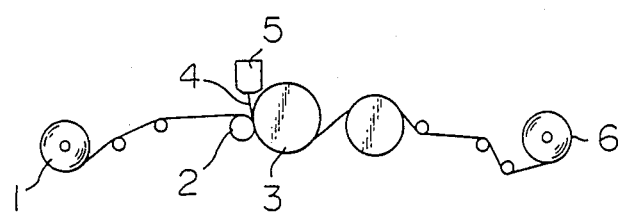
FIG. 1 schematically shows an installation which may be used in carrying out the process of the invention.

The polymeric mixture of polypropylene and polyethylene suitable for use in the process of the invention for forming the releasing layer may have a melt flow rate (MFR) of 10 to 40 g/10 minutes as measured in accordance with JIS K6758. Generally, the higher the melt flow rate, the more improved the releasing ability or the product. A mixture of polypropylene and polyethylene having a melt flow rate substantially less than 10 g/10 minutes tends to provide an insufficient releasing ability and is, therefore, unsuitable. The mixture of polypropylene and polyethylene usable in the process of the invention may have a density of 0.89 to 0.92 g/cm$^3$ as measured in accordance with JIS K6758. A mixture of polypropylene and polyethylene having a density substantially in excess of 0.92 g/cm$^3$ tends to provide a product with a relatively poor curl resistance. The mixture of polypropylene and polyethylene suitable for use in the process of the invention may exhibit, when measured by a differential scanning calorimeter (DSC), a melting point peak of 100° to 130° C. on the basis of the polyethylene and that of 155° to 165° C. on the basis of the polypropylene. The use of a mixture having excessively low melting points frequently results in a product with poor heat resistance and, therefore, should be avoided.

Melt Flow Rate (MFR) is an index for a state of melt flow. It is shown by the number of grams per 10 minutes of melted polypropylene or polyethylene being kept at 230°±0.5° C. and extruded by 2,160±10 g of a load (the sum of a weight and a piston) through a metal-made orifice (outer diameter: 9.50±0.03 mm, inner diameter: 2.095±0.005 mm, height: 8.000±0.025 mm) inserted into a cylinder.

DSC is a process for keeping a sample to be measured and a standard material under an equal temperature by heating or cooling them and recording the amounts of energy required to maintain a zero difference in temperature together with a record of time or the temperature.

Temperature sensors and heaters for compensating calories are provided in each side for the sample and the standard material. When the temperature changes at a predetermined rate, electric power is supplied to each of the heaters so that the difference of the temperature between them ($\Delta T$) may be kept at zero by the operation of the differential circuit for the compensating calories.

The amounts of electric energy required for maintaining the temperature of the two materials equal correspond to the change of heat content for the sample in the range of the temperature scanning and are recorded with the temperature scanning together with the time.

A measurement of a melting point by DSC:

10±0.5 mg of a resin sample was heated to 200° C. and left alone at room temperature for five minutes. It was then cooled to 67° C. and left alone for a minute. Then, it was heated at the rate of 5° C./minute to 200° C. The endothermic peak temperature was regarded as the melting point.

The mixture of polypropylene and polyethylene usable in the process of the invention desirably has a weight average molecular weight of about 100,000 to about 300,000. If desired, antioxidants, ultraviolet absorbents, stabilizers, antiblocking agents, antistatic agents, lubricants, pigments, dyestuffs and other additives may be incorporated into the mixture of polypropylene and polyethylene used in the process of the invention.

The mixture of polypropylene and polyethylene used in the process of the invention may be simply prepared by dry blending the components. The dry blend may be further processed, if desired. For example, it may be extruded through a mixing extruder, or may be further admixed in a Bumbury's mixer or other mixers.

As the polypropylene, which is one of the components of the polymeric mixture for forming the releasing layer, a homopolymer of propylene is preferable. However, block and random copolymers of propylene with a small amount of ethylene may also be used. The polyethylene may be a low, medium or high density polyethylene with preference given to the first mentioned two species. Most preferably a low density polyethylene is used in combination with a homopolymer of propylene. The thickness of the releasing layer formed on a suitable base from the mixture of polypropylene and polyethylene may desirably be within the range between about 10 and 60μ.

As the base, use may be made of a sheet of paper, a drawn or undrawn film of a synthetic polymer such as polyester or polypropylene, a metal foil and a fabric, alone or in a composite form.

According to the invention the base is extrusion coated with the polymeric mixture comprising polypropylene and polyethylene in the specified proportions and melt extruded through a T-die to form the releasing layer. The process may be conveniently carried out using a conventional extruder and laminater such as those described in pages 44–45 and 105–109 of "Plastic Films—Manufacture and Application", edited by Plastics Research Group and published by Gihodo Publishers Co., Ltd., Tokyo, Japan, in 1980. It should be noted, however, that the processing temperature used in the process of the invention is substantially lower than that conventionally used upon extrusion coating a paper base. More specifically, the temperature of the mixture of polypropylene and polyethylene as extruded through the T-die should be controlled at below 300° C., or a satisfactory releasing ability cannot otherwise be achieved. The use of a processing temperature within the range between 250° and 290° C. is preferred for optimum properties and processability of the product, and is advantageous from an economical view point. Preferably temperatures in barrel and die portions of the extruder are also set below 300° C., if possible.

The base may be subjected to an adhesion promoting treatment before it is extrusion coated with the mixture of polypropylene and polyethylene according to the invention. Such adhesion promoting treatments include, for example, heating, corona discharge and coating with an adhesion promoting material such as a mixture of polypropylene and polyethylene, a copolymer of ethylene with acrylic acid or an α-olefin having 3 to 8 carbon atoms, polyethyleneimine and alkyl titanate.

Depending upon the nature of the base, adhesion between the base and the releasing layer, formed thereon by extrusion coating the base with the specified mixture of polypropylene and polyethylene at a temperature below 300° C., is not always satisfactory. We have found that this problem can be conveniently solved by providing a suitable adhesion promoting layer between the base and releasing layer by a co-extrusion technique.

Thus, the invention further provides a process for producing a support suitable for use in the formation of polyurethane films, the support comprising a base and a releasing layer comprising a polymeric mixture (A) which comprises 95 to 65 parts by weight of polypropylene and 5 to 35 parts by weight of polyethylene and a resin (B) which forms an adhesion promoting layer, which process comprises co-extrusion coating the base with said mixture and simultaneously with said resin through the same T-die to form the releasing layer and the adhesion promoting layer on the base, said adhesion promoting layer promoting adhesiveness between the base and the releasing layer and being formed between them, the temperature of the mixture (A) as extruded through the T-die being controlled at below 300° C., while the temperature of the resin (B) as extruded through the T-die being controlled within the range between 290° and 330° C. and higher than the temperature of the mixture (A) as extruded.

The description given hereinbefore regarding the mixture of polypropylene and polyethylene can be applied to the polymeric mixture (A).

The resin (B) which forms the adhesion promoting layer may be selected from mixtures of polypropylene and polyethylene, and copolymers of ethylene and an α-olefin, such as propylene, butene-1, pentene-1, hexene-1 and actene-1.

Upon co-extrusion coating, while the temperature of the mixture (A) as extruded through the T-die is controlled at below 300° C., the temperature of the resin (B) as extruded through the T-die must be controlled within the range between 290° and 330° C. and higher than the temperature of the mixture (A) as extruded. As far as these conditions are met, the resin (B) may be the same as the particular mixture (A) used. We prefer to control the temperature of the mixture (A) as extruded within the range between 250° and 290° C., and that of the resin (B) as extruded within the range between 300° and 330° C. This co-extrusion coating process according to the invention makes it possible to conveniently produce a desirable product provided with a strong adhesion between the base and releasing layer in the product and also with an enhanced ability to release polyurethane films formed on the product.

The surface gloss and configuration of the releasing layer may be adjusted by varying a chill roll of the laminator used in the extrusion coating process of the invention. Furthermore, the support produced by the process of the invention may be embossed by means of a conventional embosser, if desired.

The novel support suitable for use in the formation of polyurethane films, produced by the process of the invention is useful not only in the production of polyurethane films but also in the manufacture of composite articles, such as synthetic leathers and adhesive sheets, in which a polyurethane film is combined with an adhesive or other materials.

An installation which may be used in carrying out the process of the invention is shown in FIG. 1.

The base 1 is sent from its roll towards chill-roll 3. Before being cooled by chill-roll 3, the base is extrusion coated with a polymeric mixture of polypropylene and polyethylene as extruded in a film form through extruder 5 and being controlled at below 300° C. Directly the base is extrusion coated with the mixture, the releasing layer on the base is quickly cooled by chill-roll 3. The substrate comprising the layer on the base is pressurized by pressure roll 2 when cooled. Then, the substrate is rolled by roller 6. Molten resin 4 flows from extruder 5.

The invention will be illustrated by the following examples and comparative examples.

EXAMPLES 1 to 3 and COMPARATIVE EXAMPLES 1 to 3

Using an extruder ("EXTRUDER MK-B5" having a barrel diameter of 40 mm, provided by Modern Machinery) and a laminator ("FUJI LAMINATOR 40/450" provided by Fuji Plastic Machinery) in an extrusion coating installation as shown in FIG. 1, a sheet of paper (corona discharged good quality paper having a consistency of 130 g/m$^2$) was extrusion coated with each of mixtures 1, 2 and 3 indicated in Table 1 to produce a support intended for use in the formation of polyurethane films. The thickness of the coating was about 30μ.

In each example according to the invention the procedure was carried out twice, one with a coating temperature (i.e. a temperature of the mixture as extruded) of 250° C. and the other with that of 290° C.

For comparative purposes the procedure was repeated in each comparative examples except that the temperature of the mixture as extruded through a T-die of the extruder was set at 310° C.

The products so prepared were tested for drenchability, releasing ability and performance on being embossed in the following manner. The results are shown in Table 1. Table 2 shows temperature conditions of barrel, adaptor and die portions which the extruder used in Examples 1 to 3 and Comparative Examples 1 to 3.

Table 1

|  |  | Example 1 Mixture 1 | | Comparative Example 1 Mixture 1 | Example 2 Mixture 2 | | Comparative Example 2 Mixture 2 | Example 3 Mixture 3 | | Comparative Example 3 Mixture 3 |
|---|---|---|---|---|---|---|---|---|---|---|
| Properties | Polypropylene:Polyethylene in mixture (weight ratio) | 88:12 | | 88:12 | 80:20 | | 80:20 | 70:30 | | 70:30 |
| | MFR (g/10 min.) | 25 | | 25 | 14 | | 14 | 22 | | 22 |
| | Density (g/cm$^3$) | 0.903 | | 0.903 | 0.905 | | 0.905 | 0.905 | | 0.905 |
| | Melting point by DSC (°C.) Polyethylene | 103.5 | | 103.5 | 109 | | 109 | 104 | | 104 |
| | Polypropylene | 158.5 | | 158.5 | 160 | | 160 | 159 | | 159 |
| | Weight average molecular weight | 20.2 × 10$^4$ | | 20.2 × 10$^4$ | 20.0 × 10$^4$ | | 20.0 × 10$^4$ | 20.0 × 10$^4$ | | 20.0 × 10$^4$ |
| Temp. of coating material as extruded through T-die (°C.) | | 250 | 290 | 310 | 250 | 290 | 310 | 250 | 290 | 310 |
| Surface drench index of releasing layer (dyn./cm) | | 31 | 31 | 32 | 31 | 31 | 32 | 31 | 31 | 32 |
| Peeling strength (g/30 mm) measured by Method I | | 23 | 110 | 450 | 34 | 150 | 520 | 17 | 60 | 430 |
| Rating of releasing ability | | A | B | D | A | B | D | A | A | D |

Table 1-continued

|  | Example 1 Mixture 1 | Comparative Example 1 Mixture 1 | Example 2 Mixture 2 | Comparative Example 2 Mixture 2 | Example 3 Mixture 3 | Comparative Example 3 Mixture 3 |
| --- | --- | --- | --- | --- | --- | --- |
| Rating of performance on being embossed | A    B | C-D | A    B | C-D | A    B | C-D |

Rating - A: very good, B:good, C:slightly bad, D:bad, E:very bad

TABLE 2

| | Temperature Conditions of Extruder (in °C.) | | | | | |
| --- | --- | --- | --- | --- | --- | --- |
| | Temp. of polymers as extruded through T-die | Barrel (Cylinder) | | | Adaptor | Die |
| | | C1 | C2 | C3 | | |
| Examples 1 to 3 | 250 | 190 | 245 | 274 | 251 | 265 |
| | 290 | 241 | 276 | 315 | 321 | 310 |
| Comparative Examples 1 to 3 | 310 | 256 | 295 | 335 | 340 | 340 |

Drenchability

The surface drench index of the releasing layer of the product was measured in accordance with JIS (Japanese Industrial Standard) K 6768.

Releasing ability

A thermoplastic polyurethane resin for dry process "CRISVON 5516S" (polyesterurethane, solid content of 29 to 31% by weight) supplied by Dainippon Ink Chemical Industries Co., Ltd., was diluted with methyl ethyl ketone to a solution of 22% by weight of solid. A support to be tested was coated with the solution on its releasing layer by means of an applicator bar with a clearance of 125μ, and dried in a blow drier at a temperature of 150° C. for 2 minutes. The solidified polyurethane film on the support was then backed with an adhesive tape (Nitto polyester adhesive tape No. 31B), cut into strips of a width of 30 mm, and conditioned in an atmosphere of 65% RH at 20° C. for at least one hour. Under the same atmosphere the strip was tested using a general purpose type tensile tester. The force required to peel the adhesive tape backed polyurethane film from the support at an angle of 180° and at a deformation rate of 1 m/min. was measure and reported herein as the peeling strength measured by Method I. Based on the value of the peeling strength, the releasing ability of the support was estimated.

Performance on being embossed

A support to be tested was passed through a nip between an embossing roll with a surface temperature of 130° C. and a paper roll while contacting the releasing layer of the support with the embossing roll. The pressure between the rolls was 10 Kg/cm². The extent of the design embossed on the releasing layer was visually examined and, based on the result, the performance of the support on being embossed was estimated.

Figure 2:
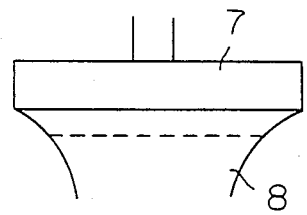
FIG. 2 shows a T-die of the extruder shown in FIG. 1.

The melt flow rate and density reported herein were measured in accordance with JIS K6758. The melting point was measured using a differential scanning calorimeter. A polymer sample weiging 10±0.5 mg was placed in a receiver of the differential scanning calorimeter, heated to a temperature of 200° C., allowed to stand for 5 minutes, cooled to a temperature of 67° C. and allowed to stand for 1 minute. The sample so conditioned was then heated to a temperature of 200° C. at a heating rate of 5° C./min. The temperature at which a peak of heat absorption appeared during the final heating step was taken as the melting point of the sample. The temperature of a coating material as extruded through a T-die was measured by contacting a thermometer for resins (type SPD-1D, provided by Tanaka Thermistor Instruments Co., Ltd.) with the material as extruded through a T-die at a level 1 cm below the T-die, as shown in FIG. 2, in which molten resin 8 flows from T-die 7.

EXAMPLES 4 to 7 and COMPARATIVE EXAMPLES 4 and 5

The procedure of Examples 1 to 3 was repeated in Examples 4 to 7 except that mixtures 4 to 7 indicated in Table 3 were respectively used instead of the mixtures 1 to 3 and a slightly higher coating temperature of 290° to 295° C. as indicated in Table 3 was used.

For comparative purposes, the procedure of Examples 4 to 7 was repeated in Comparative Examples 4 and 5 except that a homopolymer of propylene and a copolymer of ethylene and propylene as indicated in Table 3 were respectively used instead of the mixtures 4 to 7.

The products so prepared were tested for their releasing ability, performance on being embossed and curl resistance. The results are shown in Table 3.

TABLE 3

| | | Example 4 Mixture 4 | Example 5 Mixture 5 | Example 6 Mixture 6 | Example 7 Mixture 7 | Comparative Example 4 Homopolymer of propylene | Comparative Example 5 Copolymer of propylene and ethylene |
| --- | --- | --- | --- | --- | --- | --- | --- |
| Properties | Polypropylene: Polyethylene in mixture (weight ratio) | 84:16 | 80:20 | 85:15 | 90:10 | — | — |
| | MFR (g/10 min.) | 30 | — | 25 | — | 30 | 0.5 |
| | Density (g/cm³) | 0.905 | 0.904 | 0.903 | 0.902 | 0.900 | 0.900 |
| | Melting point by DSC (°C.) polyethylene | 105.5 | 104 | 104 | 104 | — | 161 |
| | Polypropylene | 160.5 | 159 | 159 | 159 | 160 | — |
| | Weight average molecular weight | $17 \times 10^4$ | $20 \times 10^4$ | $20 \times 10^4$ | $20 \times 10^4$ | — | — |
| | Temp. of coating material | 290–295 | 290–295 | 290–295 | 290–295 | 290–295 | 290–295 |

TABLE 3-continued

| | Example 4 Mixture 4 | Example 5 Mixture 5 | Example 6 Mixture 6 | Example 7 Mixture 7 | Comparative Example 4 Homopolymer of propylene | Comparative Example 5 Copolymer of propylene and ethylene |
|---|---|---|---|---|---|---|
| as extruded through T-die (°C.) | | | | | | |
| Peeling strength (g/30 mm) measured by Method I | 33 | 65 | 65 | 140 | 330 | 650 |
| Rating of releasing ability | A | A | A | B | D | D |
| Peeling strength (g/30 mm) measured by Method II | 38 | 65 | 70 | 210 | impossible to peel | impossible to peel |
| Rating of releasing ability | A | A | A | B | E | E |
| Rate of performance on being embossed | A | A | A | B | D | E |
| Rating curl resistance | A | A | A | B | — | — |

Rating - A: very good, B:good, C:slightly bad, D:bad, E:very bad

The peeling strength indicated in Table 3 as measured by Method I was measured in the manner described hereinabove. The peeling strength was also measured by the following method (Method II). A support to be tested was coated on its releasing layer with a polyurethane coating solution by means of an applicator bar with a clearance of 125μ. The coating solution comprised 100 parts by weight of a two pots reaction type polyurethane resin, "CRISVON 4010" (supplied by Dainippon Ink Chemical Industries Co., Ltd., and containing 49 to 51% by weight of solid), 8.5 parts by weight of a crosslinking agent for this resin, "CRISVON NX" (supplied by the same company and containing 73 to 76% by weight of solid), 3 parts by weight of a crosslinking accelerator for the same resin, "CRISVON Accel.-HM", supplied by the same company, and 20 parts by weight of toluene. The support so coated was dried in a blow drier at a temperature of 130° C. for 2 minutes, and aged at a temperature of 20° C. and under 65% RH for one day. The so formed polyurethane film on the support was then backed with an adhesive tape, and processed and tested in the same manner as Method I.

The performance on being embossed of the support was observed and estimated in the manner as described hereinabove.

The curl resistance of a support was estimated by visually examining the extent of curl in the support which was allowed to stand in an atmosphere of 20° C. and 85% RH.

EXAMPLE 8

Using a co-extruder, a sheet of kraft clubak paper having a consistency of 73 g/m² (a base to which a polyurethane film does not readily adhere) was extrusion coated with the mixture 1 indicated in Table 1 to form a coating of a thickness of 30μ. The temperature of that side of the coating as extruded through a T-die of the extruder, which was to be brought in contact with the base, was 310° C. and that of the opposite side of the coating as extruded was 250° C.

The product so prepared exhibited good adhesion between the base and coating as well as excellent releasing ability, performance on being embossed and curl resistance.

EXAMPLE 9

A support prepared as in Example 1 using a coating temperature of 250° C., was coated with a 22% by weight solution of "CRISVON 5516S" in methyl ethyl ketone by means of an applicator bar with a clearance of 150μ, and dried at a temperature of 130° C. for 2 minutes. The polyurethane film so formed on the support was coated with a solution of "CRISVON 4010" in toluene containing 42.8% by weight of "CRISVON 4010", 8.5 parts by weight of "CRISVON NX" based on 100 parts by weight of "CRISVON 4010" and 3 parts by weight of "CRISVON Accel. HM" based on 100 parts by weight of "CRISVON 4010", by means of an applicator bar with a clearance of 250μ. A substrate cloth for synthetic 37 CRISVON 4010" coating, and the resultant assembly was dried at a temperature of 130° C. for 2 minutes and then aged for one day under ambient conditions. The support could be readily peeled from the so prepared synthetic leather product comprising the polyurethane resin/substrate.

EXAMPLE 10

Another portion of the support used in Example 9 was coated with a thermoplastic polyurethane resin, "Pandex T-5165" (an adipatepolyester urethane supplied by Dainippon Ink Industries Co., Ltd., and having a density of 1.21) melt extruded at temperatures of 180° to 200° C. The polyurethane film so formed was solidified by cooling. The support could readily be peeled from the polyurethane film.

EXAMPLE 11

An Al. foil was extrusion coated in advance with a mixture of polypropylene and polyethylene (the ratio by weight of polypropylene to polyethylene being 60:40) to form an adhesion promoting layer of a thickness of 30μ, the temperature of the mixture as extruded through a T-die of the extruder used being 330° C. The so processed Al. foil was then extrusion coated on its coating side with the mixture 1 indicated in Table 1 to form a releasing layer of a thickness of 20μ while keeping the temperature of the mixture 1 as extruded through a T-die at 260° C.

The support so obtained exhibited a peeling strength of 20 g/30 mm as measured by Method I.

Figure 3:
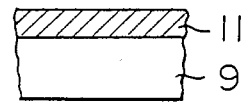
FIG. 3 is a cross sectional view of a product obtained by one embodiment of the process of the invention.
Figure 4:
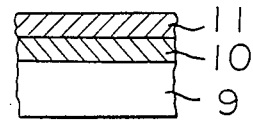
FIG. 4 is a cross sectional view of a product obtained by another embodiment of the process of the invention.

The support produced by the process of the present invention is shown by FIG. 3 and FIG. 4.

The support in FIG. 3 comprises base 9 fitted with releasing layer 11.

The support in FIG. 4 comprises base 9, adhesion promoting layer 10 and releasing layer 11 in turn.

What is claimed is:

1. A process for producing a support suitable for use in the formation of polyurethane films, the support comprising a base, a releasing layer comprising a polymeric mixture (A) which comprises 95 to 65 parts by weight of polypropylene and 5 to 35 parts by weight of polyethylene and a resin (B) which forms an adhesion promoting layer, which process comprises co-extrusion coating the base with said mixture and simultaneously with said resin through the same T-die to form the releasing layer and the adhesion promoting layer on the base, said adhesion promoting layer promoting adhesiveness between the base and the releasing layer and being formed between them, the temperature of the mixture (A) as extruded through the T-die being controlled at below 300° C., while the temperature of the resin (B) as extruded through the T-die being controlled within the range between 290° and 330° C. and higher than the temperature of the mixture (A) as extruded.

2. A process for producing a polyurethane film comprising the steps of
   (a) coating a polyurethane resin onto a support comprising a base and a releasing layer,
   (b) peeling a polyurethane film formed on said releasing layer, characterized in that said releasing layer on said base comprises a polymeric mixture of 95 to 65 parts by weight of polypropylene and 5 to 35 parts by weight of polyethylene and said support is obtained by extrusion coating said base with said mixture through a T-die to form the releasing layer on said base and the temperature of said mixture as extruded through the T-die is controlled at below 300° C. after 3. A process in accordance with claim 2 wherein after the polyurethane resin is coated onto said releasing layer in the form of a solution, said support is dried with heat to form a polyurethane film on said releasing layer.

4. A process in accordance with claim 2 wherein, said coating of said polyurethane resin is carried out by extrusion coating, and after said extrusion coating of said polyurethane resin, the polyurethane resin is solidified by cooling.

5. A process in accordance with claim 2 wherein said polymeric mixture of polypropylene and polyethylene has a melt flow rate (MFR) of 10 to 40 g/10 minutes as measured in accordance with JIS K6758, a density of 0.89 to 0.92 g/cm$^3$ as measured in accordance with JIS K6758, and melting points of 100° to 130° C. based on the polyethylene and 155° to 165° C. based on the polypropylene as measured by a differential scanning calorimeter.

6. A process for producing a polyurethane film with a cloth stuck thereto comprising the steps of
   (a) coating a polyurethane resin onto a support comprising a base and a releasing layer, said polyurethane resin forming a polyurethane film,
   (b) applying an adhesive onto said polyurethane film formed on said releasing layer,
   (c) sticking a cloth to said adhesive,
   (d) solidifying said adhesive by drying said support with heat, and
   (e) peeling said polyurethane film together with said cloth,
characterized in that said releasing layer comprises a polymeric mixture of 95 to 65 parts by weight of polypropylene and 5 to 35 parts by weight of polyethylene and said support is obtained by extrusion coating said base with said mixture through a T-die to form the releasing layer on said base and the temperature of said mixture as extruded through the T-die is controlled at below 300° C.

7. A process in accordance with claim 6 wherein after the polyurethane resin is coated onto said releasing layer in the form of a solution, said support is dried with heat to form said polyurethane film on said releasing layer.

8. A process in accordance with claim 6 wherein, said coating of said polyurethane resin is carried out by extrusion coating, and after said extrusion coating of said polyurethane resin, the polyurethane resin is solidified by cooling.

9. A process in accordance with claim 6, wherein said polymeric mixture of polypropylene and polyethylene has a melt flow rate (MFR) of 10 to 40 g/10 minutes as measured in accordance with JIS K6758, a density of 0.89 to 0.92 g/cm$^3$ as measured in accordance with JIS K6758, and melting points of 100° to 130° C. based on the polyethylene and 155° to 165° C. based on the polypropylene as measured by a differential scanning calorimeter.

10. A process for producing a polyurethane film comprising the steps of
    (a) coating a polyurethane resin onto a support comprising a base, an adhesion promoting layer and a releasing layer, and
    (b) peeling a polyurethane film formed on said releasing layer,
characterized in that said releasing layer comprises a polymeric mixture of 95 to 65 parts by weight of polypropylene and 5 to 35 parts by weight of polyethylene (Mixture (A)) and said adhesion promoting layer comprises a resin (B), and that the base is co-extrusion coated with said mixture (A) and simultaneously with said resin (B) through the same T-die to form the releasing layer and the adhesion promoting layer on the base, and said adhesion promoting layer formed between the base and the releasing layer promoting adhesiveness between them, and the temperature of the mixture (A) as extruded through the T-die is controlled at below 300° C., while the temperature of the resin (B) as extruded through the T-die is controlled within the range between 290° and 330° C. and higher than the temperature of the mixture (A) as extruded.

11. A process in accordance with claim 9 wherein after the polyurethane resin is coated onto said releasing layer in the form of a solution, said support is dried with heat to form a polyurethane film on said releasing layer.

12. A process in accordance with claim 9 wherein, said coating of said polyurethane resin is carried out by extrusion coating, and after said extrusion coating of said polyurethane resin, the polyurethane resin is solidified by cooling.

13. A process in accordance with claim 10, wherein said polymeric mixture (A) has a melt flow rate (MFR) of 10 to 40 g/10 minutes as measured in accordance with JIS K6758, a density of 0.89 to 0.92 g/cm$^3$ as measured in accordance with JIS K6758, and melting points of 100° to 130° C. based on the polyethylene and 155° to 165° C. based on polypropylene as measured by a differential scanning calorimeter.

14. A process in accordance with claim 10, wherein the temperature of the mixture (A) as extruded through the T-die is controlled within the range between 250° and 290° C., while that of the resin (B) as extruded through the T-die is controlled within the range between 300° and 330° C.

15. A process in accordance with claim 10, wherein said resin (B) is selected from a mixture of polypropylene and polyethylene and a copolymer of ethylene and an α-olefin.

16. A process for producing a polyurethane film with a cloth stuck thereto comprising the steps of
(a) coating a polyurethane resin onto a support comprising a base, an adhesion promoting layer, and a releasing layer, said polyurethane resin forming a polyurethane film,
(b) applying an adhesive onto said polyurethane film formed on said releasing layer,
(c) sticking a cloth to said adhesive,
(d) solidifying said adhesive by drying said support with heat, and with
(e) peeling said polyurethane film together with said cloth, characterized in that said releasing layer comprises a polymeric mixture of 95 to 65 parts by weight of polypropylene and 5 to 35 parts by weight of polyethylene (Mixture (A)) and said adhesion promoting layer comprises a resin (B), and that said base is co-extrusion coated with mixture (A) and simultaneously with said resin (B) through the same T-die to form the releasing layer and the adhesion promoting layer on the base and said adhesion promoting layer formed between the base and the releasing layer promotes adhesiveness between them and the temperature of the mixture (A) as extruded through the T-die is controlled at below 300° C., while the temperature of the resin (B) as extruded through the T-die is controlled within the range between 290° and 330° C. and higher than the temperature of the mixture (A) as extruded.

17. A process in accordance with claim 16 wherein after the polyurethane resin is coated onto said releasing layer in the form of a solution, said support is dried with heat to form said polyurethane film on said releasing layer.

18. A process in accordance with claim 16 wherein after the releasing layer is co-extrusion coated with the polyurethane resin, the polyurethane resin is solidified by cooling.

19. A process in accordance with claim 16, wherein said polymeric mixture (A) has a melt flow rate (MFR) of 10 to 40 g/10 minutes as measured in accordance with JIS K6758, a density of 0.89 to 0.92 g/cm³ as measured in accordance with JIS K6758, and the melting points of 100° to 130° C. based on the polyethylene and 155° to 165° C. based on the polypropylene as measured by a differential scanning calorimeter.

20. A process in accordance with claim 16, wherein the temperature of the mixture (A) as extruded through he T-die is controlled within the range between 250° and 290° C., while that of the resin (B) as extruded through the T-die is controlled within the range between 300° and 330° C.

21. A process in accordance with claim 16, wherein said resin (B) is selected from a mixture of polypropylene and polyethylene and a copolymer of ethylene and an α-olefin.

* * * * *